(12) United States Patent
Jeong

(10) Patent No.: US 7,554,563 B2
(45) Date of Patent: Jun. 30, 2009

(54) VIDEO DISPLAY CONTROL APPARATUS AND VIDEO DISPLAY CONTROL METHOD

(75) Inventor: Young-hoon Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 498 days.

(21) Appl. No.: 11/213,946

(22) Filed: Aug. 30, 2005

(65) Prior Publication Data

US 2006/0044320 A1    Mar. 2, 2006

(30) Foreign Application Priority Data

Aug. 30, 2004    (KR)  ...................... 10-2004-0068478

(51) Int. Cl.
     *G09G 5/00*      (2006.01)
     *G09G 5/36*      (2006.01)

(52) U.S. Cl. ...................................... 345/636; 345/560

(58) Field of Classification Search ................. 345/560, 345/636

See application file for complete search history.

(56) References Cited

U.S. PATENT DOCUMENTS

| | | | | |
|---|---|---|---|---|
| 5,043,714 | A | * | 8/1991 | Perlman ..................... 345/560 |
| 6,271,826 | B1 | | 8/2001 | Pol et al. ..................... 345/589 |
| 6,538,656 | B1 | * | 3/2003 | Cheung et al. .............. 345/519 |
| 6,570,626 | B1 | | 5/2003 | Mendenhall et al. |
| 6,714,256 | B2 | | 3/2004 | Broghammer et al. |
| 6,803,968 | B1 | | 10/2004 | Numata |
| 7,256,789 | B1 | * | 8/2007 | Nakamura et al. .......... 345/530 |
| 2001/0019336 | A1 | * | 9/2001 | Gordon et al. .............. 345/719 |
| 2002/0047931 | A1 | | 4/2002 | Kuo et al. |

FOREIGN PATENT DOCUMENTS

| | | |
|---|---|---|
| CN | 1215526 | 4/1999 |
| EP | 0 954 171 A1 | 11/1999 |
| JP | 2000-307956 | 11/2000 |
| JP | 2003-162275 | 6/2003 |
| KR | 10-0205224 | 4/1999 |
| KR | 1999-0046874 | 7/1999 |
| KR | 10-0249219 | 12/1999 |
| KR | 10-0281509 | 11/2000 |

(Continued)

OTHER PUBLICATIONS

English-language abstract for KR 100205224B1, published Apr. 1, 1999.

*Primary Examiner*—Ryan R Yang
(74) *Attorney, Agent, or Firm*—Staas & Halsey LLP

(57) ABSTRACT

Provided are a video display control apparatus and a video display control method. A video display control apparatus, including a data storage storing graphic/control integrated data including control information used to display graphic data to be combined with video data and the video data; and a controller combining the video data and the graphic data referring to the graphic/control integrated data and transmitting the combined data to more than one display device. As described above, the transmission capacity of video data, OSD data, and graphic data for a variety of display devices is reduced, thereby lowering the bus proportion. As a whole, the power consumption required by a system is reduced, thereby realizing to be suitable for a mobile device.

17 Claims, 11 Drawing Sheets

FOREIGN PATENT DOCUMENTS

| | | |
|---|---|---|
| KR | 10-0308008 | 8/2001 |
| KR | 10-0390028 | 2/2003 |
| KR | 10-2004-0036116 | 4/2004 |
| KR | 10-0434380 | 5/2004 |
| WO | 01/29681 A1 | 4/2001 |

* cited by examiner

VIDEO DISPLAY CONTROL APPARATUS AND VIDEO DISPLAY CONTROL METHOD

CROSS-REFERENCE TO RELATED APPLICATION

This application claims the benefit of Korean Patent Application No. 10-2004-0068478, filed on Aug. 30, 2004, in the Korean Intellectual Property Office, the disclosure of which is incorporated herein in its entirety by reference.

BACKGROUND OF THE INVENTION

1. Field of the Invention

The present invention relates to a video display control apparatus and a video display control method.

2. Description of the Related Art

As digital cameras and digital camcorders become more popular, their use is remarkably increasing. Video taken by a device such as a digital camera or a digital camcorder can be displayed on a separate video device, such as a CRT, or on LCD panel of the device, which is also used as an interface. In order to provide video data as well as information on the video data, the video data and On Screen Display (OSD) data, or the video data and graphic data, are combined and then displayed as a user interface that can be manipulated by a user.

An OSD is information that a monitor itself displays on its screen without a separate video signal. When a video signal cable is not properly connected, a message such as "check the connection" is displayed, and when various setting operations are performed using a manipulation button on the front of the monitor, the operations are displayed on screen. All of this employs the OSD function. OSD is usually used to manipulate a monitor's screen display function.

Image formats express digital color images include a variety of formats such as "YUV", "YIQ", etc. in addition to a "RGB" format used in a color computer graphic or a color television. The RGB format expresses a color image using three components: R (Red), G (Green), and B (Blue). The YUV format expresses a color image using a luminance component Y, and two color components U and V. The YIQ format is similar to the YUV format.

FIG. 1 is a reference view illustrating a conventional OSD/graphic data. FIG. 1 shows an example of a display screen displayed in a system mounted LCD panel mainly in charge of an interface of a digital camera or a digital camcorder in which video data 110 is displayed in a lowest layer, OSD information indicating a playback state 120 and a date 130 is displayed above the video data 110, and a user interface menu 140 comprising graphic data having a plurality of layers is displayed on the middle of the display screen.

If a screen displayed on an LCD panel of a digital camera or a digital camcorder is also transmitted to CRT, the OSD information indicating the playback state 120 and the date 130 is displayed; however, the user interface menu 140 is not displayed.

Conventionally, the OSD information or graphic data displayed on these display devices is stored in a separate memory, and the stored OSD information and graphic data are read, processed separately, and displayed on each display device. The graphic data may also be composed of a plurality of graphic layers which are all stored separately and are combined to be displayed on a display device.

FIG. 2 is a block diagram illustrating a general bus system including a conventional video display apparatus. Referring to FIG. 2, a bus system includes a microprocessor 210, a master 220, a postprocessor 230, a memory 240, a video display controller 250, display devices 260, and a system bus 270.

The microprocessor 210 supports an OSD that informs users of system information or video information, generates OSD data and graphic data, and stores them in a memory so as to support an alpha blending function and various graphic layers in order to provide various user interfaces.

The bus master (MASTER #2) 220, which is a device that may be a master having authority to control the bus system, includes an input unit that receives an input signal from a camera and stores the signal in a system memory.

The memory 240 stores input video data from a camera and layers of graphic data which is combined with the video data and is displayed.

The postprocessor 230 reads data from a certain area of the memory 240 and displays the data on the video display controller 250, which displays data received from the postprocessor 230 on each of the display device 260.

The system bus 270 transmits data between devices connected to the bus system.

When an input YUV signal sampled at a rate of 4:2:2 is received from a camera, the YUV signal is compressed, restored, stored, or transformed by a video processor, and the transformed data or the stored video data is displayed by a video display device. In general, video display devices express colors represented by a color coordinate system having three-dimensional coordinate axes such as R/G/B, Y/cb/Cr, Y/pb/Pr, etc. The video display device may be a single display device or a plurality of display devices, and data may be simultaneously displayed on a plurality of video display devices.

For example, when a video display device is composed of a CRT display device requiring SD (720*480 or 720*576) Y/cb/Cr video received from a camera, and of a display device requiring RGB video having a different resolution, a color converter that converts the video and a zooming converter that converts an input/output resolution are required due to the different color spaces. An alpha blending function is also required to blend the OSD data and graphic layer.

An equation used for alpha blending is described below.

$$Out(x,y)=Img(x,y)*(1-\text{alpha}(x,y))+Grp(x,y)*(\text{alpha})$$

Wherein, Img(x,y) denotes an image input to a video display control apparatus, 1-alpha(x,y) denotes an alpha blending value which is multiplied by the input image, Grp(x,y) denotes graphic data, alpha denotes an alpha blending value which is multiplied by the graphic data, and Out(x,y) denotes an alpha blended display video.

FIG. 3 is a detailed block diagram illustrating the video display apparatus shown in FIG. 2. Referring to FIG. 3, the video display apparatus includes a memory 240, a postprocessor 230, an NTSC encoder 251, an LCD controller 252, a CRT 261, and an LCD 262.

The memory 240 stores video data 241, graphic data 242 and alpha data 243 for the CRT, and graphic data 244 and alpha data 245 for the LCD.

The video data 241 contains an input Y/Cb/Cr signal received from a camera, which is sampled using an interfacing method at a rate of 4:2:2.

The graphic data 242 and alpha data 243 for the CRT indicate graphic data and alpha data which are displayed on the CRT. The size of graphic data and alpha data is 720*480 which is the same as the video data. The graphic data 244 and alpha data 245 for the LCD indicate graphic data and alpha data which are displayed on the LCD. The size of graphic data and alpha data is 480*240. Each graphic data is generally sampled at 4:4:4, and an alpha value is generally expressed as a level of 16 or 256.

The postprocessor 230 includes a YCbCr2RGB 231, a (1-alpha) blender 232, an alpha blender 233, an alpha blender 234, an adder 235, an RGB2YCbCr 236, a scalar 237, and an adder 238.

The YCbCr2RGB 231 converts a YcbCr signal of the video data 241 read from the memory 240 into RGB for alpha blending. The (1-alpha) blender 232 performs alpha blending by multiplying (1-alpha) by the video data converted into a RGB format. The alpha blender 233 performs alpha blending for the graphic data for the CRT by multiplying the alpha data 243 by the graphic data 242 which are read from the memory 240. The alpha blender 234 performs alpha blending for the graphic data for the LCD by multiplying the alpha data 245 by the graphic data 244 which are read from the memory 240. The adder 235 adds the alpha blended video data and the alpha blended graphic data and outputs them to the RGB2YCbCr 236. The RGB2YCbCr 236 converts the received data in a RGB format into an YCbCr format. The scalar 237 changes the resolution of the alpha blended video data to correspond to the size of the LCD. The adder 238 adds the alpha blended video data whose resolution is changed and the alpha blended graphic data and outputs them to the LCD controller 252.

The NTSC encoder 251 outputs data received from the RGB2YCbCr 236 to the CRT 261, and the CRT 261 displays the received data. The LCD controller 252 outputs the data received from the adder 238 to the LCD 262, and the LCD 262 displays the received data.

Meanwhile, as most multimedia devices tend to require a high compressibility and various data transformations, the data bus proportion maintains considerably high. As the portability of multimedia devices increases, the clock signal of a system is decreased by decreasing various methods to reduce operation of the inside of the system and the bus proportion.

However, the bus proportion of a video display control apparatus among a plurality of masters on bus is rather considerably high due to various types of data. A graphic handling is to read each layer from the memory and directly add it in hardware, which also results in increasing the bus proportion.

FIG. 4 is a reference view illustrating the graphic layer and the graphic data shown in FIG. 3. Referring to FIG. 4, layer 0 and layer 1 having a size of 720*480 are read from a memory and combined in order to generate graphic data for the CRT. Layer 0, layer 1, and layer 2 having a size of 480*240 are read from a memory and are combined in order to generate graphic data for the LCD. As such, the memory contains a plurality of layers required to generate each graphic data, and the postprocessor 230 has to read all the layers in order to generate the graphic data as show in FIG. 3. Accordingly, a bottleneck occurs in a bus system between the memory 240 and the post processor 230.

The above conventional method increases the size of the bus proportion.

SUMMARY OF THE INVENTION

Additional aspects and/or advantages of the invention will be set forth in part in the description which follows and, in part, will be apparent from the description, or may be learned by practice of the invention.

The present invention provides a video display control apparatus and a video display control method that reduce a data transmission to lower the amount of bus data in a video display control system having more than one display device.

According to an aspect of the present invention, there is provided a video display control apparatus including: a data storage storing a graphic/control integrated data including graphic data to be combined with video data and the control information used to display the video data; and a controller combining the video data and the graphic data referring to the graphic/control integrated data and transmitting the combined data to more than one display device.

The controller may include a parser analyzing the graphic/control integrated data and extracting an alpha information on the graphic data, information on a display device on which the graphic data is displayed, and a color data of the graphic data; more than one alpha blender receiving the color data based on the information on a display device and alpha blending the color data using an alpha value based on the extracted alpha information; and an adder combining the alpha blended graphic data displayed from the alpha blender and the video data.

The controller may further include a format converter converting the output data from the adder to correspond to a color format of the display device; and a scalar converting the output data from the format converter to be corresponding to a resolution of the display device.

The controller may include a parser analyzing information on each line included in the graphic/control integrated data; a run-length decoder run-length decoding line data of the graphic/control integrated data in order to extract alpha information on the graphic data, information on a display device on which the graphic data is displayed, and color data of the graphic data from the graphic/control integrated data; more than one alpha blender receiving the graphic data based on the information on a display device and alpha blending the color data using an alpha value based on the extracted alpha information; and an adder combining the alpha blended graphic data displayed from the alpha blender and the video data.

The controller may further include a format converter converting the output data from the adder to correspond to a color format of the display device; and a scalar converting the output data from the format converter to correspond to a resolution of the display device.

The line information may include at least one item of information with respect to each line indicating whether OSD data exists, whether run-length encoding is performed, whether a bitmap table is used, and whether it is the same as an upper line.

According to another aspect of the present invention, there is provided a video display control method, including: storing graphic/control integrated data including graphic data to be combined with video data and the control information used to display the video data; combining the video data and the graphic data referring to the graphic/control integrated data; and transmitting the combined data to more than one display device.

The combining may include analyzing the graphic/control integrated data and extracting alpha information on the graphic data, information on a display device on which the graphic data is displayed, and color data of the graphic data; receiving the color data based on the information on a display device and alpha blending the color data using an alpha value based on the extracted alpha information; and combining the alpha blended graphic data and the video data.

The combining may further include converting the combined data to a color format of the display device; and converting the data whose format is converted to a resolution of the display device.

The combining may include analyzing information on each line included in the graphic/control integrated data; run-length decoding line data of the graphic/control integrated data in order to extract alpha information on the graphic data, information on a display device on which the graphic data is displayed, and color data of the graphic data from the graphic/control integrated data; receiving the graphic data based on the information on a display device and alpha blending the color data using an alpha value based on the extracted alpha information; and combining the alpha blended graphic data and the video data.

The combining may further include converting the combined data to a format of the display device; and converting the data whose format is converted to a resolution of the display device.

The line information may include at least one information with respect to each line indicating whether an OSD data exists, whether a run-length encoding is performed, whether a bitmap table is used, and whether it is the same as an upper line.

The combining may include reading and storing the graphic/control integrated data line by line, and run-length decoding, If a present line is determined to be identical to a just previously decoded line data by the information indicating whether it is the same as the upper line included in the line information, the line data just previously decoded.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
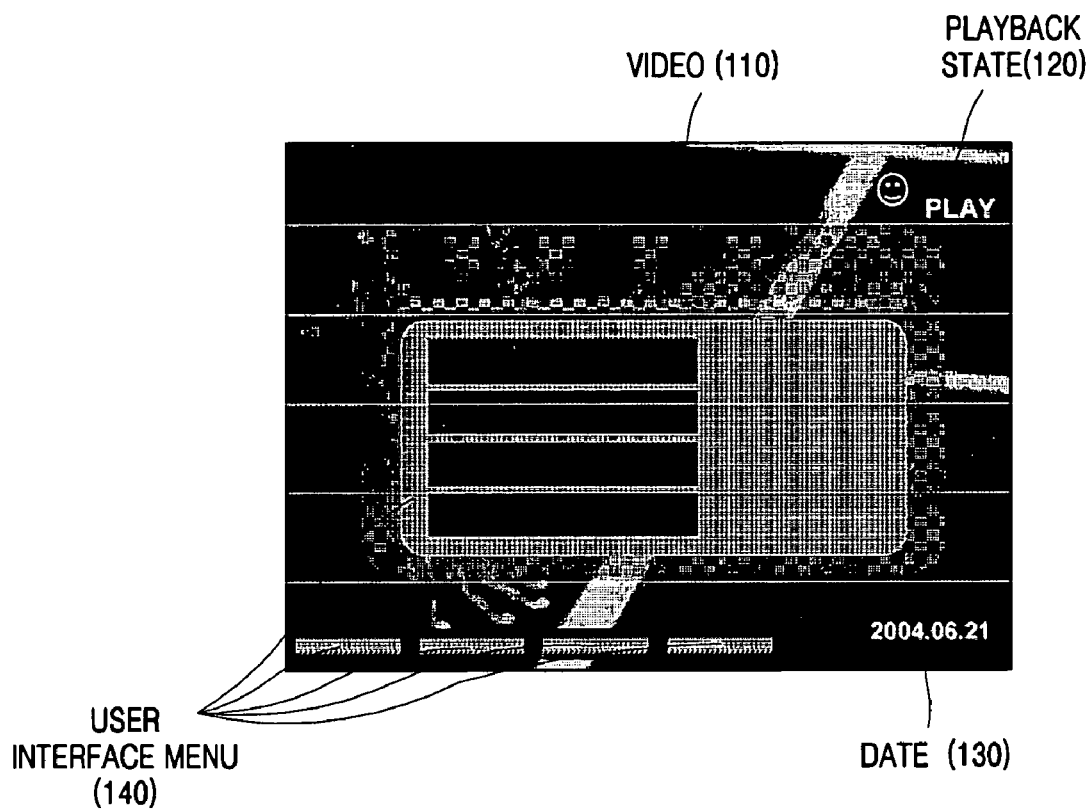
FIG. 1 is a reference view illustrating a conventional OSD/graphic data.
Figure 2:
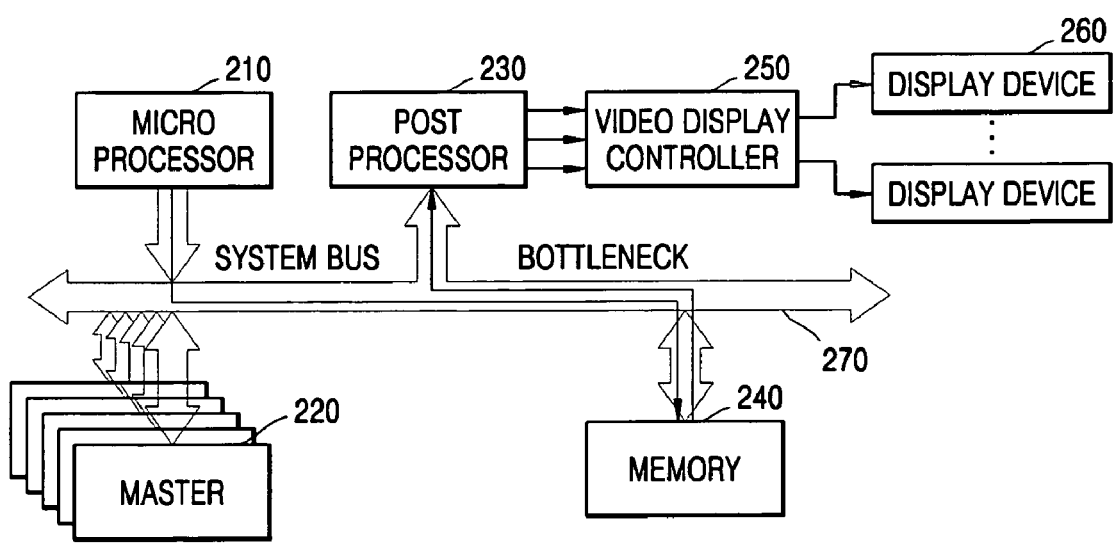
FIG. 2 is a block diagram illustrating a general bus system including a conventional video display apparatus.
Figure 3:
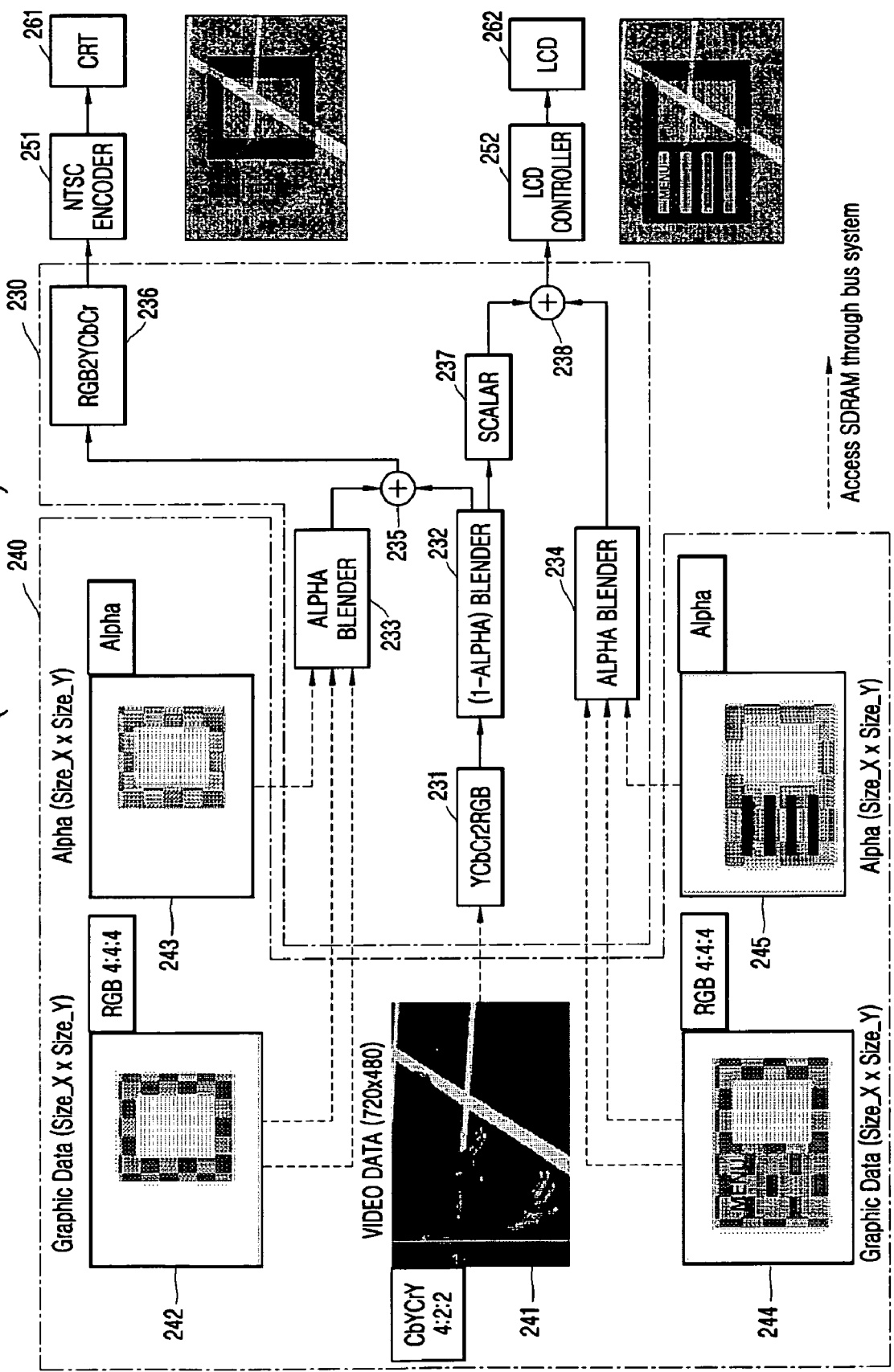
FIG. 3 is a detailed block diagram illustrating a video display apparatus shown in FIG. 2.
Figure 4:
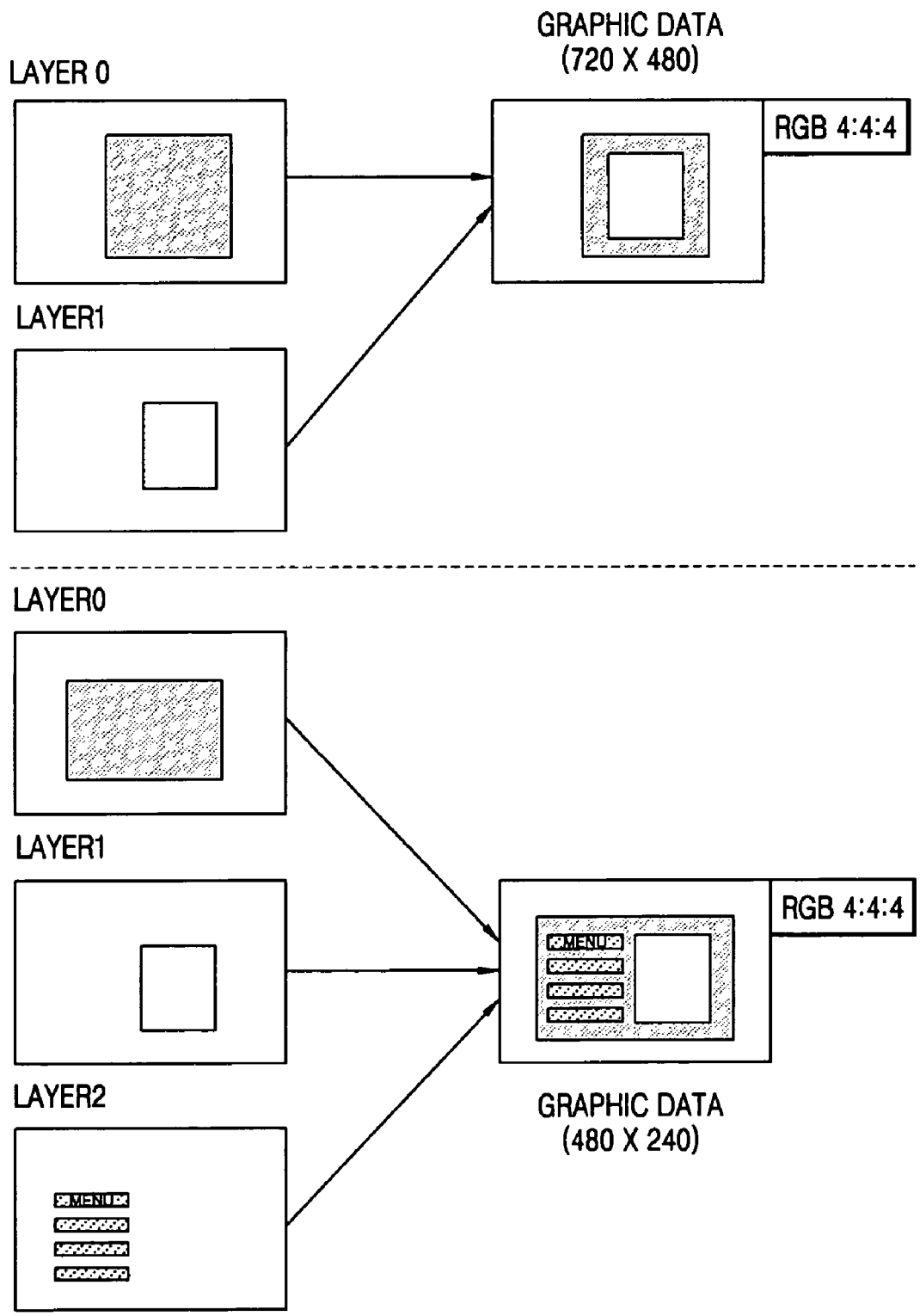
FIG. 4 is a reference view illustrating a graphic layer and a graphic data shown in FIG. 3.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention will now be described more fully with reference to the accompanying drawings.

Figure 5:
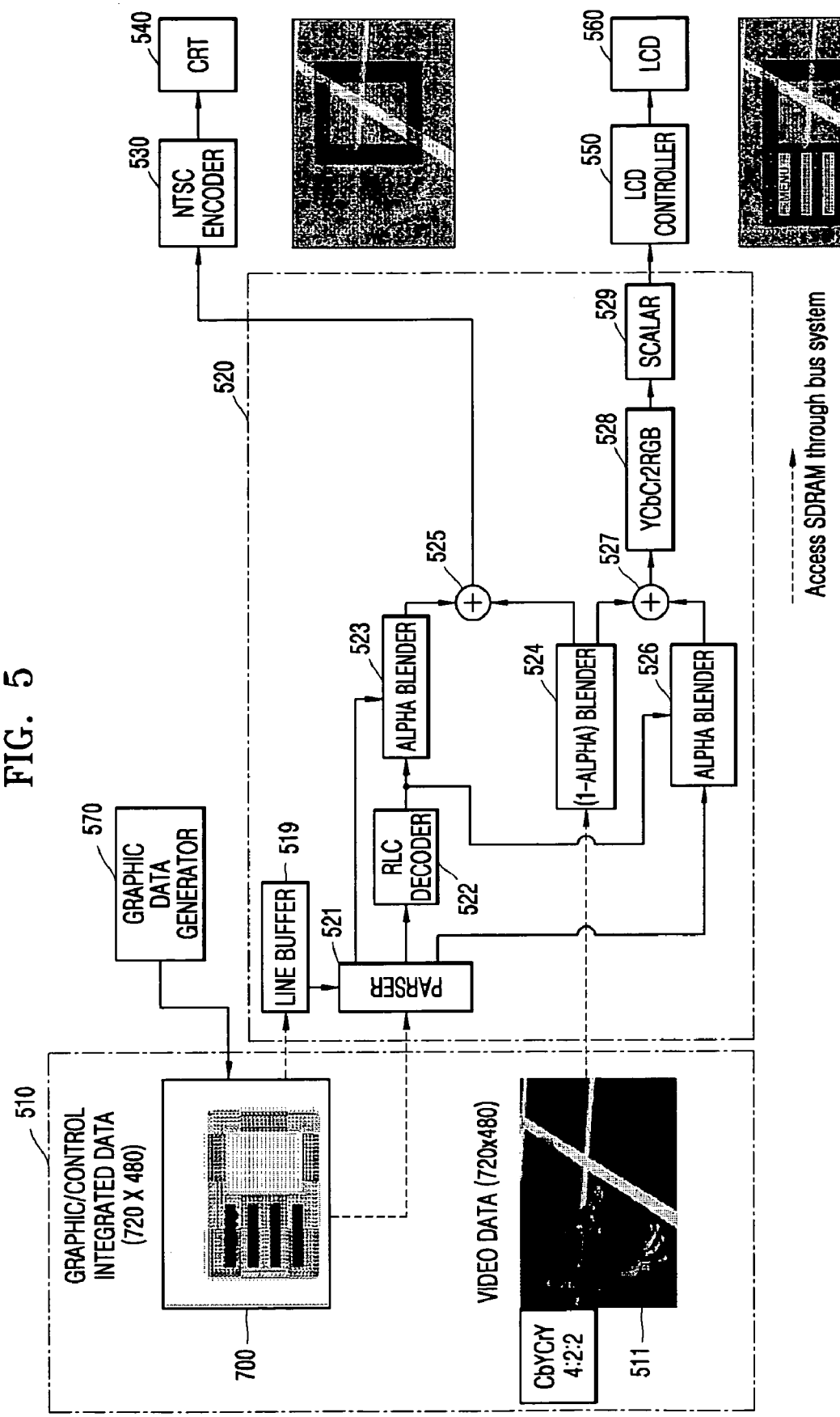
FIG. 5 is a block diagram illustrating a video display apparatus having a plurality of display units according to an embodiment of the present invention.

FIG. 5 is a block diagram illustrating a video display apparatus having a plurality of display devices according to an embodiment of the present invention. Referring to FIG. 5, a video display apparatus includes a memory 510, a postprocessor 520, an NTSC encoder 530, a CRT 540, an LCD controller 550, an LCD 560, and a graphic data generator 570.

In the apparatus shown in FIG. 5, the graphic data generator 570 generates graphic/control integrated data 700 and stores it in the memory 510, and the postprocessor 520 reads the graphic/control integrated data 700 stored in the memory 510, combines it with video data and displays the combined data on the respective display devices.

First, the graphic data generator 570 generates the graphic/control integrated data 700 in which information on OSD data, graphic layers, alpha information, display devices are integrated and stores it in the memory 510 according to an embodiment of the present invention. The memory 510 stores the video data 511 and the graphic/control integrated data 700.

The video data 511 can be data which is stored by an encoding process (not shown) from a camera or camcorder, and has a size of, for example, 720*480.

The graphic/control integrated data 700 integrates graphic layers includes final graphic data to be displayed on a display device and includes additional alpha information and information on other display devices. The configuration of the graphic/control integrated data 700 stored in the memory 510 is illustrated in FIG. 7.

Figure 7:
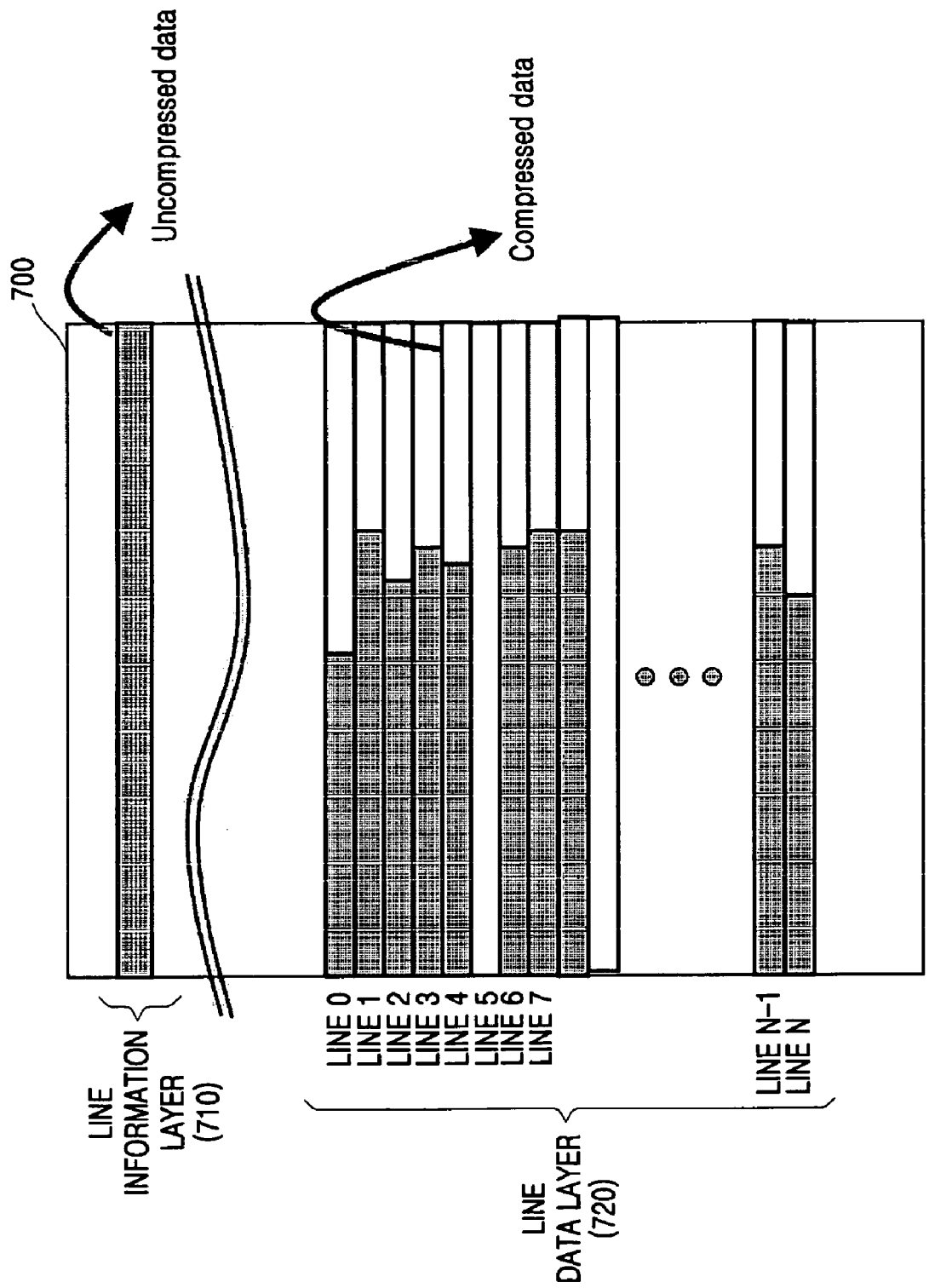
FIG. 7 is a structure chart describing a graphic/control integrated data stored in an external memory shown in FIG. 5.
Figure 8:
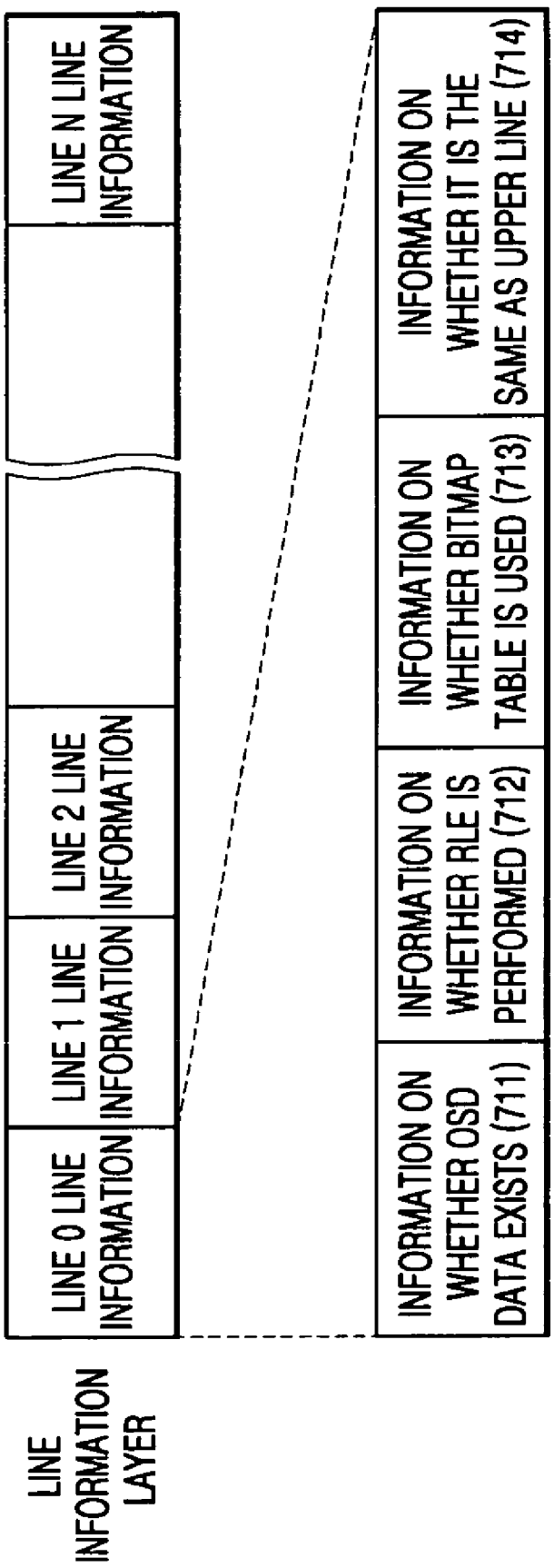
FIG. 8 is a structure chart describing data of a line information layer shown in FIG. 7.
Figure 9:
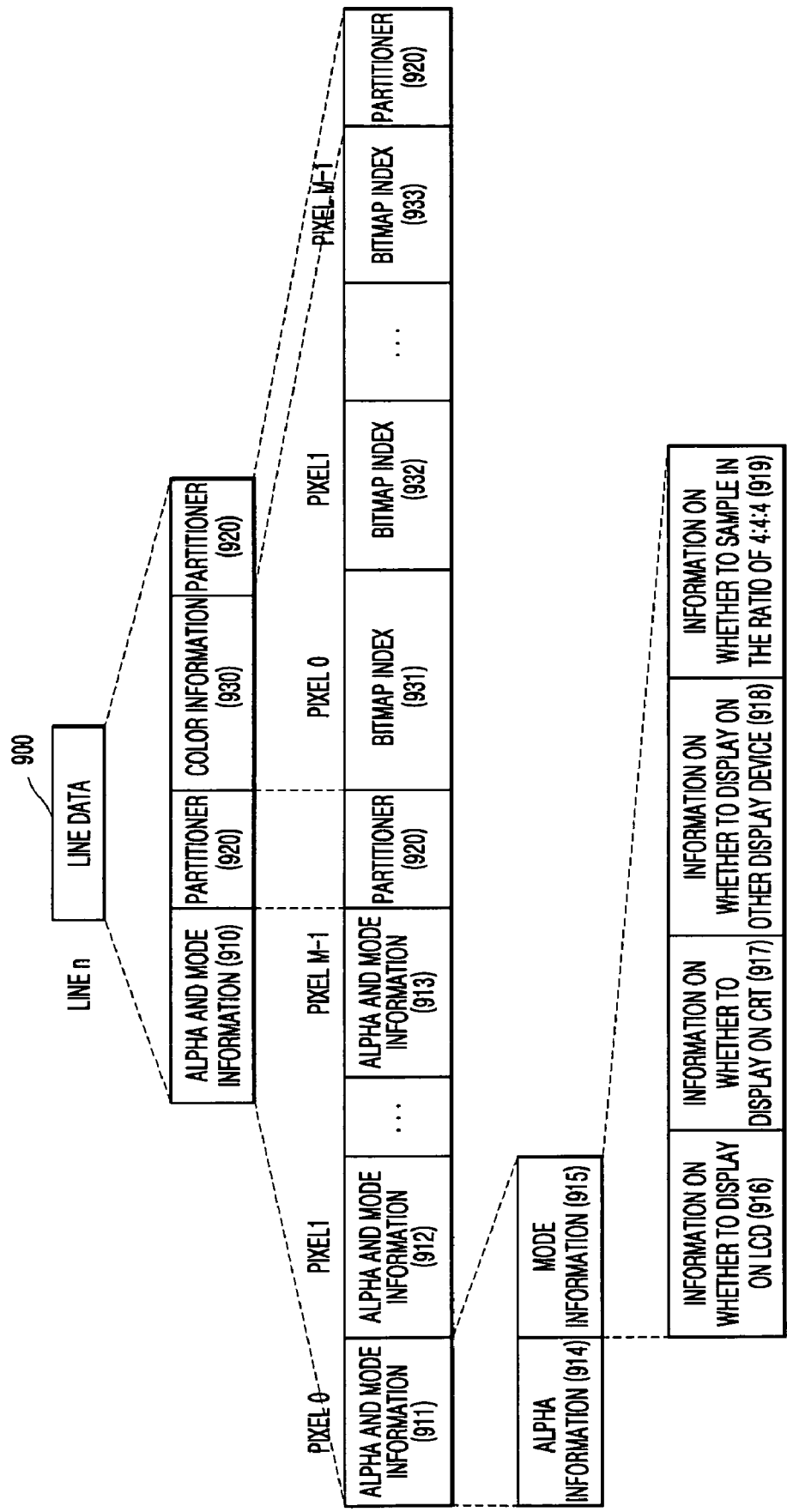
FIG. 9 is an example of a line data of a line data layer shown in FIG. 7.

Referring to FIG. 7, the graphic/control integrated data 700 includes a line information layer 710 and a line data layer 720. The line information layer 710 is uncompressed data, which contains information on each line. The line data layer 720 is pixel data contained in each line, which may be compressed by run-length encoding, etc. The specific data content of the line information layer 710 is illustrated in FIG. 8, and the specific content of the line data layer 720 is illustrated in FIG. 9. These will be described in detail later.

Figure 6:
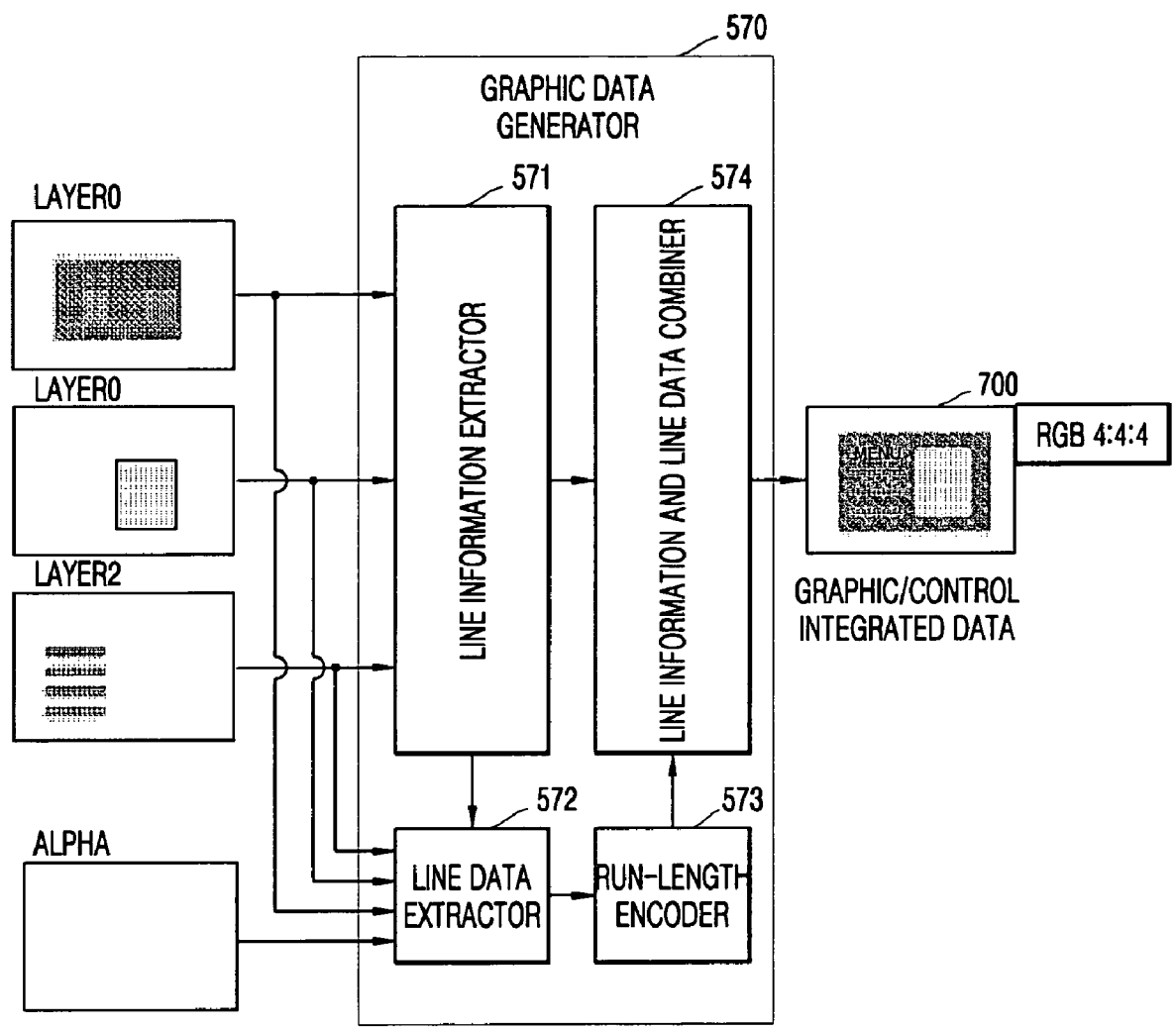
FIG. 6 is a detailed block diagram illustrating a graphic data generator shown in FIG. 5.

The specific configuration of the graphic data generator 570 is illustrated in FIG. 6. Referring to FIG. 6, the graphic data generator 570 includes a line information extractor 571, a line data extractor 572, a run-length encoder 573, and a line information and line data combiner 574. If each constituent of the graphic data generator 570 is made up of by a process using API (Application Programming Interface) through software, various and splendid graphic interfaces which cannot be expressed in a method using an existing OSD chip are expressed. Since every graphic layer and OSD information are formed on a single of layer, a plurality of layers are combined into a single of layer in the existing hardware, which definitely decreases bus proportion. The method of generating data in a process is sufficiently applied under the condition that a frequency of changing a graphic-related video is 3 to 5 frames for a second.

The line information extractor 571 receives input data on every layer, e.g., layer 0, layer 1, and layer 2, to be used for the graphic data, and extracts line information on the graphic data in which all the layers are combined. The combined graphic layers which are composed of pixels horizontally and lines perpendicularly extract information on each line. For every line from the combined graphic layers, the line information extractor 571 determines whether OSD data exists, whether it is appropriate to perform run-length encoding, whether a bitmap table is used, and whether a line has the same data as that of an upper line, extracts information thereon, and generates the line information layer 710 as shown in FIG. 8.

Referring to FIG. 8, the line information layer 710 has information on each line of data including the combined graphic layers. If the data including the combined graphic layers are composed of n lines, the line information layer 710 has n lines information. The respective line information includes information on whether OSD data exists 711, information on whether a RLE (Run Length Encoding) is performed 712, information on whether a bitmap table is used 713, and whether it is the same as an upper line 714.

Information on whether OSD data exists 711 is used when OSD data does not exist in a line, and instead of the line being processed a next line is processed. Information on whether run-length encoding is performed 712 is used for performing the run-length encoding when the run-length encoding is more effective as data contained in the line is determined and thus the same data is very redundant. Information on whether a bitmap table is used 713 is whether to regard each pixel data as an index of the bitmap table or whether to use the actual color value as it is. Information on whether it is the same as an upper line 714 is used to employ the previous line data without reading the present line from a memory again in a decoding if the present line is made up of the same data as that of a previous line.

The line data extractor 572 receives input data and alpha information on every layer, i.e., layer 0, layer 1, and layer 2, to be used for the graphic data and extracts line data therefrom. The line data includes information on pixels contained in each line. The information on each pixel includes pixel data, i.e., a color value, an alpha value to be applied to the pixel, and information on which display device the pixel data is displayed. Since the OSD data and graphic layer data are integrated for use according to an embodiment of the present invention, with respect to each pixel, there is information indicating to which display device the pixel data is transmitted. For example, as shown in FIG. 1, the playback state 120, date 130, and user interface menu 140 of the graphic data are all displayed on the LCD; however, the OSD information indicating the playback state 120 and data 130 is displayed only on the CRT. Accordingly, each pixel includes information on a display device to which the pixel is transmitted so that the data indicating the playback state 120 and the data 130 is displayed on both a CRT and an LCD, and the user interface menu 140 is displayed on the LCD only.

An example of line data 900 generated by the line data extractor 572 is illustrated in FIG. 9. Referring to FIG. 9, the line data 90 includes alpha and mode information 910, a partitioner 920, color information 930, and a partitioner 920.

The alpha and mode information 910 includes information on an alpha value which is applied to each pixel, and on a display device on which each pixel is displayed. The partitioner 920 is an identifier to identify the alpha and mode information 910 and the color information 930. The color information 930 which is information to express the color of each pixel, is comprised of a luminance signal and a color difference signal.

Each of the pixels has the alpha and mode information, and color information. Referring to FIG. 9, the alpha and mode information 910 contains alpha and mode information 911 on pixel 0, alpha and mode information 912 on pixel 1, . . . , and alpha and mode information 913 on pixel M-1. If a bitmap table holds color information of each pixel, the color information 930 contains a bitmap index 931 on pixel 0, a bitmap index 932 on pixel 1, . . . , and a bitmap index 933 for pixel M-1.

The alpha and mode information on each of the pixels contains alpha information 914 and mode information 915.

The alpha information 914 indicates an alpha value to adjust the transparency of a pixel, and the mode information 915 contains information on a display device on which the pixel is displayed and information on whether the pixel is sampled at a rate of 4:4:4.

Referring to FIG. 9, the mode information 915 contains information on whether a pixel is displayed on an LCD 916, information on whether a pixel is displayed on a CRT 917, information on whether a pixel is displayed on other devices, and information on whether a pixel is sampled at the rate of 4:4:4 919. As in the system shown in FIG. 5, the same data is not always displayed on more than two display devices such as the CRT 540 and the LCD 560. For example, with respect to a display device including a touch screen or scroll bar, the display device has to include information for a menu and button, etc., which are not indispensable for other display devices. Hence, graphic/control integrated data included in a memory contains information considering every condition. However, it is required to determine whether a pixel is displayed on every display device. Information on a display device is included in the mode information, which is merely an example. If other display devices are employed, the corresponding information has to be included in the mode information.

Whether a pixel is sampled at the rate of 4:4:4 919 intends to handle a 4:4:4 sampling in an alpha blending considering that as an alpha blending operation is handled using quantized pixel information, an image quality is reduced in a system which is expressed as 4:2:2 as shown in FIG. 5.

The run-length encoder 573 receives output line data from the line data extractor 572 and performs run-length encoding on every line. With regard to a line whose run-length encoding is determined not to be performed in the line information extractor 571, run-length encoding is not performed on the line according to the information and the line is displayed on the line information and line data combiner 574.

An example where a run-length is encoded by the run-length encoder 573 is described.

Figure 10:
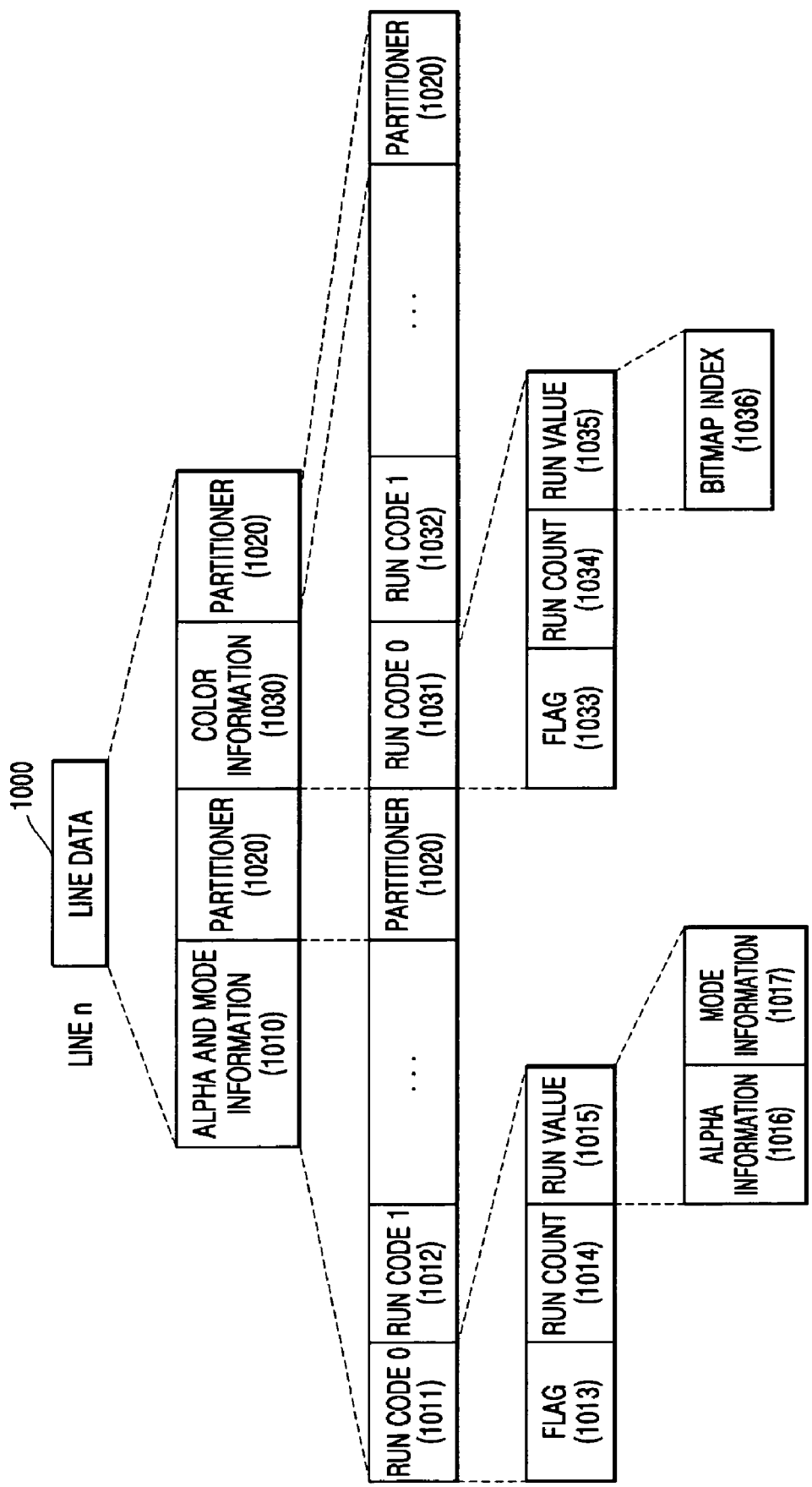
FIG. 10 is another example of a line data of a line data layer shown in FIG. 7.

Referring to FIG. 10, line data 1000 includes alpha and mode information 1010, a partitioner 1020, color information 1030, and a partitioner 1020.

The alpha and mode information 1010 contains run code 0 1011, run code 1 1012, . . . which are run-length encoded. Each run code contains a flag 1013 indicating a run code, a run count 1014 indicating a run length, and a run value 1015. The run value 1015 contains alpha information 1016 and mode information 1017.

The color information 1030 contains run code 0 1031, run code 1 1032, . . . .

Each run code contains a flag 1033 indicating a run code, a run count 1034, and a run value 1035. The run value 1035 indicates a bitmap index 1036. In line data run-length encoding according to an embodiment of the present invention, the alpha and mode information and color information are run-length encoded separately, and are partitioned by a partitioner.

Figure 11:
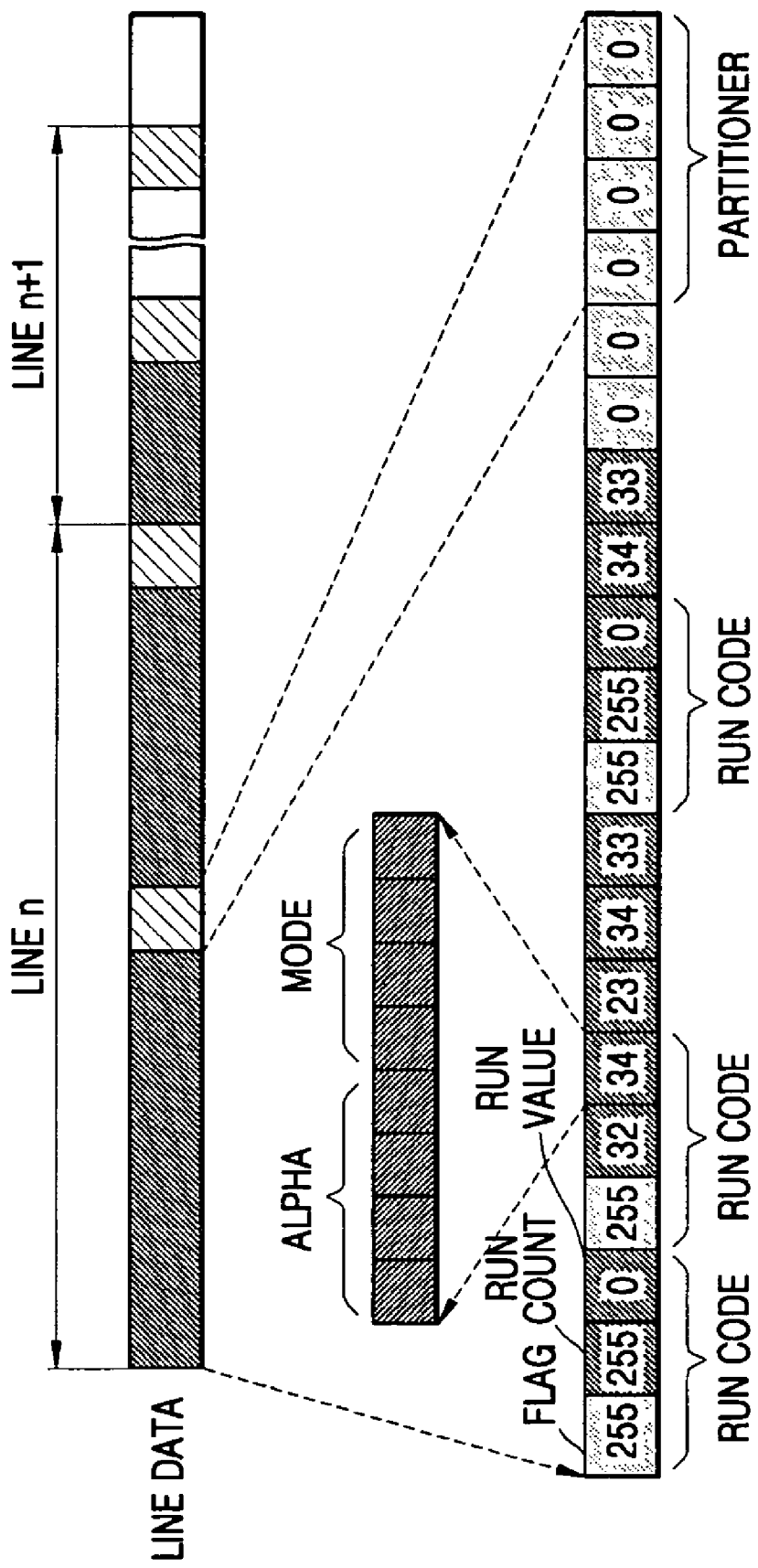
FIG. 11 is a specific example of a line data where a run-length is encoded shown in FIG. 10.

A specific example of line data in which a run-length is encoded is illustrated in FIG. 11.

Referring to FIG. 11, each flag of run codes is expressed as 255 in an example of alpha and mode information in which the run-length is encoded. A first run code indicates consecutive runs of 255 each having a run value of 0, and a second run code indicates consecutive runs of 32 each having a run value of 34.

Since 23, 34, 33 after the second run code has no flag of 255, they indicate the alpha information and mode information of an individual pixel. A next run code indicates consecutive runs of 255 each having a run value of 0. Since 34, 33 after the run code has no flag of 255, they indicate the alpha information and mode information of an individual pixel. In the last six 0s, two 0s are to comply with a unit of 32-bit, and other four 0s are partitioners to partition the alpha and mode information and color information.

The postprocessor 520 includes a line buffer 519, a parser 521, a run-length decoder 522, an alpha blender 523, a (1-alpha) blender 524, an adder 525, an alpha blender 526, an adder 527, an YCbCr2RGB 528, and a scalar 529.

The line buffer 519 reads the graphic/control integrated data 700 stored in the memory 510 line by line and stores it. First, the line buffer 519 receives the line information of the graphic/control integrated data 700.

The parser 521 reads data stored in the line buffer 519 and separates input data by lines which are run-length encoded into their characteristics. First, the parser 521 reads line information stored in the line buffer 519 and analyzes it.

Referring to FIG. 8, line information includes the information on whether OSD data exists 711, whether a RLE is performed 712, the information on whether a bitmap table is used 713, and the information on whether it is the same as an upper line 714.

The parser 521 first analyzes the information on whether the OSD data exists 711 in the line information, if the OSD data exists, controls to read line data corresponding to the line information and store it in the line buffer 519, if the OSD data does not exist, analyzes next line information since there is no need to read the line data. The information on whether the OSD data exists makes it possible to remove transmission of line which has no data for transmission, thereby lowering the bus proportion.

The parser 521 analyzes the information on whether a RLE is performed 712, if a run-length encoding is performed, controls line data stored in the line buffer 519 to be decoded by the run-length decoder 522, and if a run-length encoding is not performed, directly extracts detailed data, i.e., alpha information, mode information, and color information included in the line data and transmits it to an alpha blender.

The parser 521 analyzes the information on whether a bitmap table is used 713, if the bitmap is used, controls to find an index of a bitmap table (not shown) and get a color value corresponding to the index to be alpha blended in analyzing the color information of line data.

The parser 521 analyzes whether it is the same as an upper line 714, if the present line has the same data as that of an upper line (line just previously decoded), and does not read line data from a memory but uses the present line data stored in the line buffer 519. If the present line is determined to be identical to the upper line owing to the information, the parser uses data included in the line buffer as it is without reading line data from the memory, thereby lowering the bus proportion. If they are not identical to each other, next line data is read from the graphic/control integrated data 700 stored in the memory and is stored in the line buffer 519. The run-length decoder 522 simultaneously decodes every stream separated from the parser 521 and extracts or calculates alpha information, mode information, and color information.

As described referring to FIG. 9, the mode information includes information on a display device on which a pixel is displayed. Based on the information on a display device included in the mode information, an alpha value and color value are displayed on an alpha blender 523 or an alpha blender 526. The alpha blender 523 is for a display on the CRT, and the alpha blender 526 is for a display on the LCD. The mode information may include information on whether a pixel is to sample at the rate of 4:4:4. In a case where information on whether a pixel is to be sampled at the rate of 4:4:4 is set to use a 4:4:4 sampling, an alpha blender is controlled to perform alpha blending using the 4:4:4 sampling, thereby preventing an image quality from being decreased.

The alpha blender 523 performs alpha blending by multiplying an alpha value and color value which are received from the run-length decoder 522.

The (1-alpha) blender 524 receives input video data which are read from the memory 510 and multiplies (1-alpha) the video data by and performs alpha blending.

The adder 525 adds graphic data received from the alpha blender 523 and alpha blended and video data received from the (1-alpha) blender 524 and alpha blended and outputs it to the NTSC encoder 530.

The alpha blender 526 performs the alpha blending by multiplying an alpha value and color value which are received from the run-length decoder 522.

The adder 527 adds graphic data received from the alpha blender 526 and alpha blended and video data received from the (1-alpha) blender 524 and alpha blended and outputs it to the YCbCr2RGB 528.

The YCbCr2RGB 528 converts a TCbCr format received from the adder 527 into a RGB format and outputs it to the scalar 529. The scalar 529 changes resolution of data received from the YCbCr2RGB 528 to correspond to the LCD display device, and outputs the converted data to the LCD controller 550. The NTSC encoder 530 outputs data received from the adder 525 to the CRT 540, and the CRT 540 displays the received data. The LCD controller 550 outputs the data received from the scalar 529 to the LCD 560, and the LCD 560 displays the received data.

Figure 12:
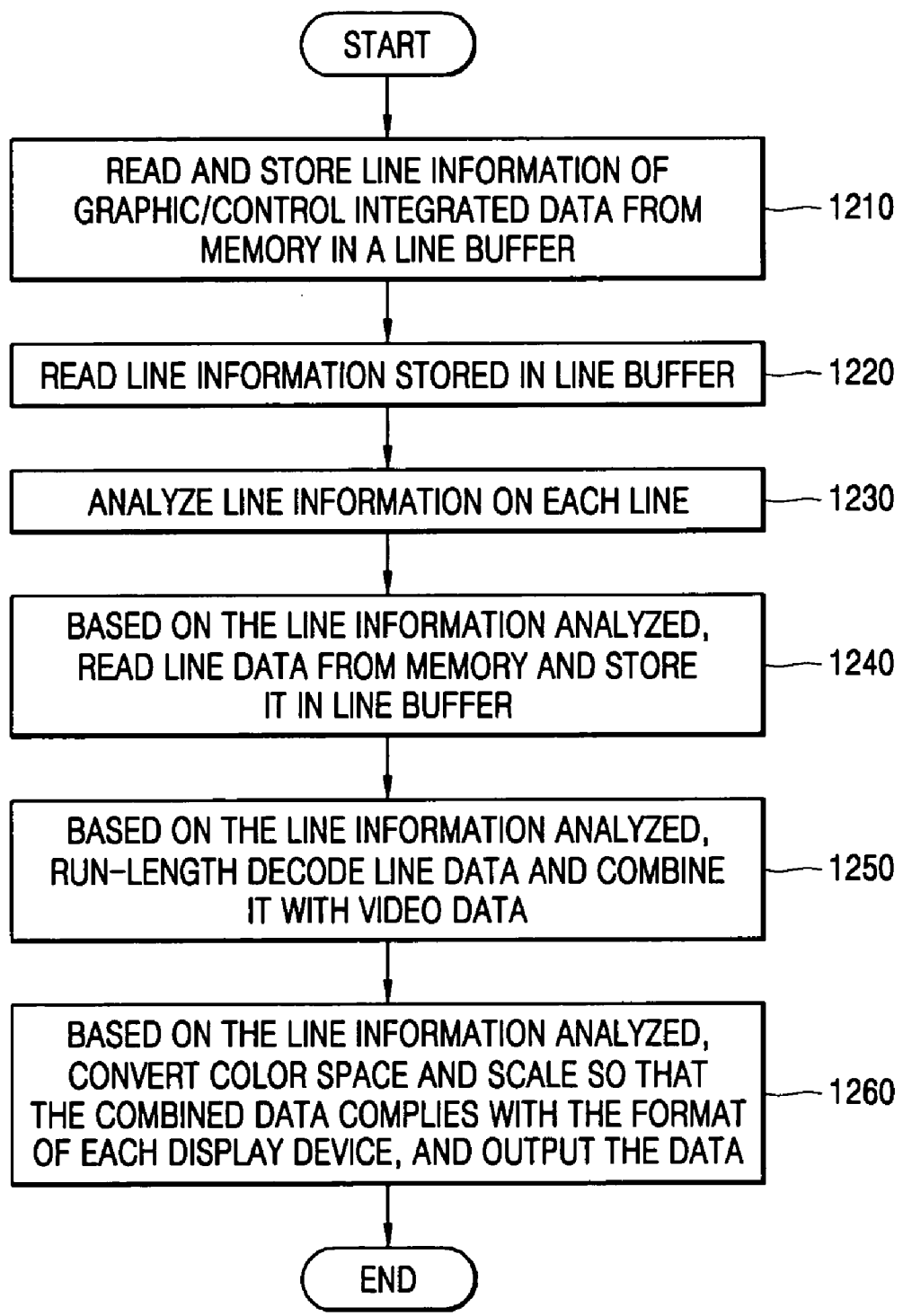
FIG. 12 is a flow chart describing process of a video display method in a video display apparatus having a plurality of display units according to an embodiment of the present invention.

FIG. 12 is a flow chart describing a video display method used in a video display apparatus having a plurality of display devices according to one embodiment of the present invention.

Referring to FIG. 12, the line information on graphic/control integrated data is read from a memory and stored in a line buffer in Operation 1210. A parser reads the line information stored in the line buffer in Operation 1220. The parser analyzes line information on each line in Operation 1230. Based on the line information analyzed by the parser, line data is read from the memory and stored in the line buffer in Operation 1240. Based on the analyzed line information, the line data is run-length decoded and is combined with video data in Operation 1250.

Based on the analyzed line information, a color space is converted and a scale is converted so that the combined data complies with the format of each display device and is displayed in Operation 1260.

It is possible for the present invention to be realized on a computer-readable recording medium as a computer-readable code. Computer-readable recording mediums include every kind of recording device that stores computer system-readable data. ROM, RAM, CD-ROM, magnetic tape, floppy disc, optical data storage, etc. are used as a computer-readable recording medium. The computer-readable recording mediums can also be realized in the form of a carrier wave (e.g., transmission through Internet). A computer-readable recording medium is dispersed in a network-connecting computer system, resulting in being stored and executed as a computer-readable code by a dispersion method. A functional program, code and code segments, used to implement the present invention can be derived by a skilled computer programmer from the description of the invention contained herein.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the present invention is defined not by the detailed description of the invention but by the appended claims, and all differences within the scope of the present invention will be construed as being included in the present invention.

Data for a video display controller has a good much portion of a general multimedia device compared to other modules, and a variety of effects are more increasing in order to support a variety of user environments.

Accordingly, as described above, the transmission capacity of a video data, an OSD data, and a graphic data for a variety of display devices is reduced, thereby lowering a bus proportion. As a whole, the power consumption required by systems is reduced, thereby realizing to be suitable for a mobile device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A video display control apparatus, comprising:
   a data storage storing a video data and a graphic/control integrated data including graphic data to be combined with the video data and control information used to display the graphic data; and
   a controller combining the video data and the graphic data based on the graphic/control integrated data and transmitting the combined data to at least one display device,
   wherein the graphic/control integrated data comprises a line information layer and a line data layer, the line data layer comprises pixel data included in each line of a plurality of lines constituting the graphic data, and the line information layer comprises the control information on the each line of the plurality of lines constituting the graphic data, and
   wherein the line information comprises at least more than one item of information with respect to each line indicating whether OSD data exists, whether run-length encoding is performed, whether a bitmap table is used, and whether it is the same as an upper line.

2. The apparatus of claim 1, wherein the controller comprises:
   a parser analyzing the graphic/control integrated data and extracting an alpha information on the graphic data, information on a display device on which the graphic data is displayed, and a color data of the graphic data;
   more than one alpha blender receiving the color data based on the information on a display device and alpha blending the color data using an alpha value based on the extracted alpha information; and
   an adder combining the alpha blended graphic data displayed from the alpha blender and the video data.

3. The apparatus of claim 2, wherein the controller further comprises:
   a format converter converting the output data from the adder to a predetermined color format of the display device; and
   a scalar converting the output data from the format converter to a predetermined resolution of the display device.

4. The apparatus of claim 1, wherein the controller comprises:
   a parser analyzing information on each line included in the graphic/control integrated data;
   a run-length decoder run-length decoding line data of the graphic/control integrated data in order to extract alpha information on the graphic data, information on a display device on which the graphic data is displayed, and color data of the graphic data from the graphic/control integrated data;
   more than one alpha blender receiving the graphic data based on the information on a display device and alpha blending the color data using an alpha value according to the extracted alpha information; and
   an adder combining the alpha blended graphic data displayed from the alpha blender and the video data.

5. The apparatus of claim 4, wherein the controller further comprises:
   a format converter converting the output data from the adder to correspond to a color format of the display device; and
   a scalar converting the output data from the format converter to correspond to a resolution of the display device.

6. The apparatus of claim 1, wherein:
   the controller further comprises a line buffer reading and storing the graphic/control integrated data line by line, and
   the parser, if a present line is determined to be identical to a just previously decoded line data by the information indicating whether it is the same as the upper line included in the line information, transmits the line data just previously decoded and stored in the line buffer to the run-length decoder.

7. A video display control method, comprising:
   storing a video data and a graphic/control integrated data including graphic data to be combined with video data and the control information used to display the graphic data;
   combining the video data and the graphic data referring to the graphic/control integrated data; and
   transmitting the combined data to at least one display device,
   wherein the graphic/control integrated data comprises a line information layer and a line data layer, the line data layer comprises pixel data included in each line of a plurality of lines constituting the graphic data, and the line information layer comprises the control information on the each line of the plurality of lines constituting the graphic data, and
   wherein the line information comprises at least one information of each line indicating whether an OSD data exists, whether a run-length encoding is performed, whether a bitmap table is used, and whether it is the same as an upper line.

8. The method of claim 7, wherein the combining comprises:
   analyzing the graphic/control integrated data and extracting alpha information on the graphic data, information on a display device on which the graphic data is displayed, and color data of the graphic data;
   receiving the color data based on the information on a display device and alpha blending the color data using an alpha value based on the extracted alpha information; and combining the alpha blended graphic data and the video data.

9. The method of claim 8, wherein the combining further comprises:
   converting the combined data to a predetermined color format of the display device; and
   converting the data whose format is converted to a predetermined resolution of the display device.

10. The method of claim 7, wherein the combining comprises:
    analyzing information on each line included in the graphic/control integrated data;
    run-length decoding line data of the graphic/control integrated data in order to extract alpha information on the graphic data, information on a display device on which the graphic data is displayed, and color data of the graphic data from the graphic/control integrated data;
    receiving the graphic data based on the information on a display device and alpha blending the color data using an alpha value according to the extracted alpha information; and
    combining the alpha blended graphic data and the video data.

11. The method of claim 10, wherein the combining further comprises:
    converting the combined data to a predetermined format of the display device; and
    converting the data whose format is converted to a predetermined resolution of the display device.

12. The method of claim 7, wherein the combining comprises:
    reading and storing the graphic/control integrated data line by line, and
    run-length decoding, if a present line is determined to be identical to a just previously decoded line data by the information indicating whether it is the same as the upper line included in the line information, the line data just previously decoded.

13. A video display control method, comprising:
    using a computer to perform the steps of:
    reading graphic/control integrated data including graphic data to be combined with video data and control information used to display the video data, the graphic/control integrated data comprising a line information layer and a line data layer, the line data layer comprising pixel data included in each line of a plurality of lines constituting the graphic data, and the line information layer comprising control information on the each line of the plurality of lines constituting the graphic data;
    checking a plurality of data fields of the line information layer; and
    performing a corresponding process based on a result of the checking operation,
    wherein the line information comprises at least one information of each line indicating whether an OSD data exists, whether a run-length encoding is performed, whether a bitmap table is used, and whether it is the same as an upper line.

14. The video display control method of claim 13, wherein the corresponding process is reading an OSD data if an OSD data field is on.

15. The video display control method of claim 13, wherein the corresponding process is an RLE (Run Length Encoding) if an RLE data field is on.

16. The video display control method of claim 13, wherein the corresponding process is a bit mapping if a bit map data filed is on.

17. The video display control method of claim 13, wherein the corresponding process is reading a line data from a present line if the same as an upper line field is on.

* * * * *

UNITED STATES PATENT AND TRADEMARK OFFICE
CERTIFICATE OF CORRECTION

PATENT NO. : 7,554,563 B2  Page 1 of 1
APPLICATION NO. : 11/213946
DATED : June 30, 2009
INVENTOR(S) : Young-hoon Jeong It is certified that error appears in the above-identified patent and that said Letters Patent is hereby corrected as shown below:

Column 12, Line 40, change "the control" to --control--.

Signed and Sealed this

Third Day of November, 2009

David J. Kappos
*Director of the United States Patent and Trademark Office*